United States Patent [19]

Tabayashi et al.

[11] Patent Number: 4,975,117

[45] Date of Patent: Dec. 4, 1990

[54] ORGANIC SOLVENT-BASED INK FOR INK-JET PRINTER

[75] Inventors: Isao Tabayashi, Saitama; Hiroshi Harada, Osaka; Sadahiro Inoue, Chiba; Hiroshi Fukutomi, Saitama, all of Japan

[73] Assignee: Dainippon Ink and Chemicals Inc., Tokyo, Japan

[21] Appl. No.: 325,420

[22] Filed: Mar. 20, 1989

Related U.S. Application Data

[63] Continuation of Ser. No. 159,092, Feb. 23, 1988, abandoned.

[30] Foreign Application Priority Data

Feb. 24, 1987 [JP] Japan .................................. 62-40763

[51] Int. Cl.$^5$ .............................................. C09D 11/02
[52] U.S. Cl. .......................................... 106/22; 106/20
[58] Field of Search ................................ 106/22, 20

[56] References Cited

U.S. PATENT DOCUMENTS

| | | | |
|---|---|---|---|
| 4,395,288 | 7/1983 | Eida et al. | 106/22 |
| 4,620,876 | 11/1986 | Fujii et al. | 106/22 |
| 4,661,158 | 4/1987 | Kobayashi et al. | 106/22 |
| 4,680,332 | 7/1987 | Hair et al. | 106/22 |

FOREIGN PATENT DOCUMENTS 2183873 1/1974 France .
56-73006 6/1981 Japan .

OTHER PUBLICATIONS

Derwent Abstracts, an 82-56229E/27, "Aqueous Ink Composition for Jet Printing", Japanese Patent J57087477, 5/31/82.

Derwent Abstracts, an 84-033178/06, "Recording Ink Composition", Japanese Patent J58222167, 12/23/83.

*Primary Examiner*—Paul Lieberman
*Assistant Examiner*—Christine A. Skane
*Attorney, Agent, or Firm*—Armstrong, Nikaido, Marmelstein, Kubovcik & Murray

[57] ABSTRACT

An organic solvent-based ink for ink-jet printer comprises at least one compound selected from the group consisting of an aromatic sulfonamide and a hydroxybenzoic acid ester and an oil-soluble dye dissolved in an organic solvent.

5 Claims, No Drawings

ORGANIC SOLVENT-BASED INK FOR INK-JET PRINTER

This application is a continuation of application Ser. No. 159,092, filed Feb. 23, 1988 now abandoned.

BACKGROUND OF THE INVENTION

1. Field of the Invention

The present invention relates to an organic solvent-based ink for use in an ink-jet printer.

2. Prior Art

Several systems have been proposed for ink-jet recording; electric field controlled jet that is ejected under an electrostatic attractive force; drop-on-demand ink (impulse jet) that is ejected under the oscillating pressure created by a piezoelectric transducer; and thermal ink jet that is ejected under the pressure created by air bubbles formed and grown with heat. These and other known methods of ink-jet recording are capable of producing an image with a very high degree of resolution.

Inks used in ink-jet printer are generally of two types: water-based inks which employ water as the principal solvent, and organic solvent-based inks which employ organic solvents as the principal solvent. Images printed with water-based inks are usually low in water resistance whereas organic solvent-based inks are capable of providing printed image with improved water resistance and the prints produced have excellent quality.

Whichever type of inks are used in ink-jet printer, abnormal ink ejection frequently occurs for various reasons such as nozzle clogging, filter clogging and time-dependent changes in ink properties. Since this has been a major cause of limited application of ink-jet recording systems, it is very important to develop inks, particularly organic solvent-based inks for ink-jet printer, that can be ejected in a more consistent way and many proposals have been put forth to meet this need. For example, with a view to stabilizing the dissolution or dispersion of coloring materials used in inks, Japanese Patent Publication No. 344/1982 and Japanese Patent Application (OPI) Nos. 78050/1980, 3871/1982, 3873/1982 and 36381/1986 (a term "OPI" herein means unexamined Japanese Patent Publication) have proposed improvements centering on the solvents to be incorporated in organic solvent-based inks. However, the experiments conducted by the present inventors have shown that these prior art organic solvent-based inks cannot always be ejected in a consistent way.

SUMMARY OF THE INVENTION

An object of the present invention is to provide an organic solvent-based ink that can be ejected consistently to produce printed images of good quality.

The object of the present invention can be attained by an organic solvent-based ink in which at least one compound selected from the group consisting of aromatic sulfonamides and hydroxybenzoic acid esters and an oil-soluble dye are dissolved in an organic solvent.

According to the present invention, there is to provide an organic solvent-based ink for ink-jet printing which comprises at least one compound selected from the group consisting of an aromatic sulfonamide and a hydroxybenzoic acid ester and oil-soluble dye dissolved in an organic solvent.

DETAILED DESCRIPTION OF THE INVENTION

The organic solvent-based ink of the present invention assures highly stable ink ejection over a prolonged period of time for an ink-jet printer. In addition, the ink can be left to stand at the nozzle orifice for a prolonged period of time without deterioration in its properties. Furthermore, printed images of good quality can be produced using the ink of the present invention.

In order to produce stable ink ejection, the present inventors prepared organic solvent-based inks for an ink-jet printer by combining various kinds of oil-soluble dyes and organic solvents and investigated the quality of printed characters and the consistency of ink ejection over prolonged printing with three types of printers, i.e., electric field controlled ink-jet printer, drop-on-demand printer and thermal ink-jet printer. As a result, it was found that combinations of dyes and ordinary organic solvents alone were insufficient to ensure stable ink ejection and the ability of inks to be left at the nozzle orifice over a prolonged period of time without deterioration in their properties. In particular, the stability of ink ejection was very low in a system that additionally employed an air stream to increase the driving frequency and hence the speed of flight of ink droplets. Microscopic observation of these phenomena revealed that when the solvent evaporated by a very small amount at the nozzle orifice, dye is crystalized out of the solution at the nozzle orifice in spite of the presence of a sufficient amount of solvent to dissolve the dye and that this led to abnormal ink ejection from the orifice. It was also found that dye crystallization at the nozzle orifice was particularly heavy when the dye had a great tendency to crystallize.

On the basis of these findings, the present inventors conducted intensive studies on an effective method for preventing dye crystallization a the nozzle orifice so as to ensure consistent ink ejection. As a result, the present inventors found that the objection could effectively be attained by incorporating an aromatic sulfonamide or a hydroxybenzoic acid ester in organic solvent-based inks.

It is not completely clear why an addition of these compounds contributes to improved stability of ink ejection. A plausible explanation will be as follows: the polar moiety of the molecules of an aromatic sulfonamide or hydroxybenzoic acid ester is strongly oriented toward the polar moiety of the dye molecule so as to mask the polar point; at the same time, the distance between dye molecules is increased to facilitate their movement and the affinity of the dye for the solvent is sufficiently increased to prevent its crystallization.

Illustrative aromatic sulfonamides that can be used in the present invention include p-toluenesulfonamide, N-ethyl-p-toluenesulfonamide, N-butyl-p-toluenesulfonamide and N-cyclohexyl-p-toluenesulfonamide. These aromatic sulfonamides are preferably incorporated in the organic solvent-based ink of the present invention in amounts of 0.1–40 wt%.

Illustrative hydroxybenzoic acid esters that can be used in the present invention include 2-ethylhexyl p-hydroxybenzoate and n-nonyl p-hydroxybenzoate. These hydroxybenzoic acid esters are preferably incorporated in the organic solvent-based ink of the present invention in amounts of 0.1–40 wt%.

These aromatic sulfonamides and hydroxybenzdic acid esters have so large polarity that they may be able to prevent dye crystallization in a very effective manner.

Any dye being soluble in organic solvents or the aforementioned aromatic sulfonamides or hydroxybenzoic acid esters can be used in the present invention. Typically useful dyes, include azo dyes, metal complex salt dyes, naphthol dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes, and phthalocyanine dyes. These dyes may be used either independently or in combination. The dyes are preferably incorporated in the organic solvent-based ink of the present invention in amounts of 0.1–10 wt%, with the range of 0.5–5 wt% is more preferred.

The type of organic solvents to be used in the present invention depends, to some extent, on dyes but since most dyes are polar, highly polar solvents will act as good solvents and less polar solvents act as poor solvents Therefore, less polar solvents which have a small ability to dissolve dyes are not favorable for the purpose of dissolving dyes. However, even such solvents can be used if they are mixed with the aforementioned aromatic sulfonamides or hydroxybenzoic acid esters. If desired, less polar solvents may be combined with highly polar solvents. Specific examples of the organic solvents that can be used in the present invention include: aliphatic hydrocarbons; naphthenic hydrocarbons; aromatic hydrocarbons such as mono- or di-substituted alkylnaphthalenes, alkyl derivatives of biphenyls, xylylethane and phenethylcumene; glycols; mono- or di-alkyl ethers of glycols and esters of glycols; aliphatic acids and esters thereof; nitrogenous compounds such as amide and pyrrolidone compounds. It should, however, be noted that these are not the sole examples of the organic solvents that can be used in the present invention.

The higher their boiling points, the more advantageous the solvents are from the viewpoint of reduced evaporation and drying speed. However, solvents having a higher boiling temperatures have a tendency to produce viscous inks that are difficult to eject in a smooth way. On the other hand, solvents having lower boiling points produce inks that will dry too quickly at the nozzle orifice. Therefore, a suitable solvent having the desired viscosity and boiling point should be selected in consideration of the measure adopted by the print head to prevent ink drying.

The following examples are provided for the purpose of further illustrating the present invention but are in no way to be taken as limiting. In the Examples, a percent shows based on weight.

EXAMPLE 1

| | |
|---|---|
| Oil-soluble black dye (nigrosine dye) | 4.0% |
| Phenethylcumene | 56.0% |
| Diglyme | 20.0% |
| 2-Ethylhexyl p-hydroxybenzoate | 20.0% |

The above-listed ingredients were mixed and stirred well at room temperature to form a complete solution. The solution was filtered through a membrane filter (0.45 μm in pore size) to make an organic solvent-based ink. Continuous jet formation with this ink on a field-controlled ink-jet printer produced stable ink ejection even after 500 hours. The ink remained stable in solution even after it was left to stand for 6 months at room temperature and it was successfully ejected in a consistent manner. The printer was left for a month with no cap on the nozzle, and yet the ink was successfully ejected again in jet form without clogging the nozzle orifice. In all instances, the print was clean and produced image of good quality.

EXAMPLE 2

| | |
|---|---|
| Oil-soluble black dye (chromium premetalized dye) | 3.0% |
| Diisopropylnaphthalene | 64.0% |
| Carbitol | 18.0% |
| N-Ethyl-p-toluenesulfonamide | 15.0% |

The above-listed ingredients were mixed and -0 stirred well at room temperature to form a complete membrane filter (0.45 μm in pore size) to form an organic solvent-based ink. Continuous jet formation with this ink on a thermal ink-jet printer produced stable ink ejection even after 500 hours. The ink remained stable in solution even after it was left to stand for 6 months at room temperature and it was successfully ejected in a continuous manner. The printer was left for a month with no cap on the nozzle and yet the ink was successfully ejected again in jet form without clogging the nozzle orifice. In all instances, the print was clean and produced image of good quality.

EXAMPLE 3

| | |
|---|---|
| Oil-soluble cyan dye (copper phthalocyanine dye) | 3.5% |
| Phenethylcumene | 80.5% |
| Diethylene glycol hexyl ether | 15.0% |
| N-butyl-p-toluenesulfonamide | 1.0% |

The above-listed ingredients were mixed and stirred well at room temperature to form a complete solution. The solution was filtered through a membrane filter (0.45 μm in pore size) to form an organic solvent-based ink. Continuous jet formation with this ink on a field-controlled ink-jet printer produced stable ink ejection eve after 500 hours. The ink remained stable in solution even after it was left to stand for 6 months at room temperature and it was successfully ejected in a consistent manner. The printer was left for a month with no cap on the nozzle and yet the ink was successfully ejected again in jet form without clogging the nozzle orifice. In all instances, the print was clean and produced image of good quality.

EXAMPLE 4

| | |
|---|---|
| Oil-soluble magenta dye (rhodamine dye) | 4.0% |
| Isopropylnaphthalene | 76.0% |
| Carbitol | 15.0% |
| N-Cyclohexyl-p-toluenesulfonamide | 5.0% |

The above-listed ingredients were mixed and stirred well at room temperature to form a complete solution. The solution was filtered through a membrane filter (0.45 μm in pore size) to form an organic solvent-based ink. Continuous jet formation with this ink on a drop-on-demand ink-jet printer produced stable ink ejection even after 500 hours. The ink remained stable in solution even after it was left to stand for 6 months at room temperature and it was successfully ejected in a consistent manner. The printer was left for a month with no cap on the nozzle, and yet the ink was successfully ejected again in jet form without clogging the nozzle orifice. In all instances, the print was clean and produced images of good quality.

EXAMPLE 5

| | |
|---|---|
| Oil-soluble yellow dye (quinoline dye) | 2.0% |
| Methylnaphthalene | 67.0% |
| Diglyme | 16.0% |
| n-Nonyl p-hydroxybenzoate | 15.0% |

The above-listed ingredients were mixed and stirred well at room temperature to form a complete solution. The solution was filtered through a membrane filter (0.45 μm in pore size) to form an organic solvent-based ink. Continuous jet formation with this ink on a drop-on-demand ink-jet printer produced stable ink ejection even after 500 hours. The ink remained stable in solution even after it was left to stand for for 6 months at room temperature and it was successfully ejected in a continuous manner. The printer was left to stand for a month with no cap on the nozzle and yet the ink was successfully ejected again in jet form without clogging the nozzle orifice. In all instances, the print was clean and produced image of good quality.

COMPARATIVE EXAMPLE 1

| | |
|---|---|
| Oil-soluble black dye (same as used in Example 1) | 4.0% |
| Phenethylcumene | 56.0% |
| Triethylene glycol monomethyl ether | 20.0% |
| Diglyme | 20.0% |

The above-listed ingredients were mixed and stirred well at room temperature to form a complete solution. The solution was filtered through a membrane filter (0.45 μm in pore size) to form an organic solvent-based ink. In a continuous jet formation test conducted with a field-controlled ink-jet printer, the ink started to be ejected abnormally in 50 hours. The print lacked some degree of sharpness and the image produced was somewhat inferior to that attained in Example 1.

COMPARATIVE EXAMPLE 2

| | |
|---|---|
| Oil-soluble black dye (same as used in Example 2) | 3.0% |
| Diisopropylnaphthalene | 64.0% |
| Carbitol | 33.0% |

The above-listed ingredients were mixed and stirred well at room temperature to form a complete solution. The solution was filtered through a membrane filter (0.45 μm in pore size) to form an organic solvent-based ink. In a continuous jet formation test on a thermal ink-jet printer, the ink started to be ejected abnormally in 10 hours. The print lacked some degree of sharpness and the image it produced was somewhat inferior to that attained in Example 2.

COMPARATIVE EXAMPLE 3

| | |
|---|---|
| Oil-soluble cyan dye (same as used in Example 3) | 3.5% |
| Phenethylcumene | 80.5% |
| Diethyleneglycol hexylether | 16.0% |

The above-listed ingredients were mixed and stirred well at room temperature to form a complete solution. The solution was filtered through a membrane filter (0.45 μm in pore size) to form an organic solvent-based ink. In a continuous jet formation on a field-controlled ink-jet printer, the ink started to be ejected abnormally in 10 hours. The print lacked some degree of sharpness and the image produced was somewhat inferior to that attained in Example 3.

COMPARATIVE EXAMPLE 4

| | |
|---|---|
| Oil-soluble magenta dye (same as used in Example 4) | 4.0% |
| Isopropylnaphthalene | 76.0% |
| Carbitol | 20.0% |

The above-listed ingredients were mixed and stirred well at room temperature to form a complete solution. The solution was filtered through a membrane filter (0.45 μm in pore size) to form an organic solvent-based ink. In a continuous jet formation on a drop-on-demand ink-jet printer, the ink started to be ejected abnormally in 20 hours. The print lacked some degree of sharpness and the image produced was somewhat inferior to that attained in Example 4.

COMPARATIVE EXAMPLE 5

| | |
|---|---|
| Oil-soluble yellow dye (same as used in Example 5) | 2.0% |
| Methylnaphthalene | 67.0% |
| Diglyme | 21.0% |
| N-Methyl-2-pyrrolidone | 10.0% |

The above-listed ingredients were mixed and stirred well at room temperature to form a complete solution. The solution was filtered through a membrane filter (0.45 μm in pore size) to form an organic solvent-based ink. In a continuous jet formation test on a drop-on-demand ink-jet printer, the ink started to be ejected abnormally in 30 hours. The print lacked some degree of sharpness and the image produced was somewhat inferior to that attained in Example 5.

The organic solvent-based ink of the present invention which is intended to be used in ink-jet printer produces printed image of good quality and ensures very stable ink ejection over a prolonged period of recording with an ink-jet printer. The organic solvent-based ink of the present invention also provides record of high quality and reliability even when it is used with a mechanical recording system such as a pen plotter.

While the invention has been described in detail and with reference to specific embodiment thereof, it will be apparent to one skilled in the art that various changes and modifications can be made therein without departing from the spirit- and scope thereof.

What is claimed is:

1. A non-aqueous organic solvent-based ink for an ink-jet printer consisting essentially of:
   at least one compound selected from the group consisting of 2-ethylhexyl p-hydroxybenzoate and n-nonyl p-hydroxybenzoate;
   an oil-soluble dye; and at least one organic solvent 2. A non-aqueous organic solvent-based ink according to claim 1 whose content of the 2-ethylhexyl p-hydroxybenzoate or n-nonyl p-hexybenzoate is in the range of 0.1–40 wt%.

3. A non-aqueous organic solvent-based ink according to claim 1 whose content of the oil-soluble dye is in the range of 0.1–10 wt%.

4. A non-aqueous organic solvent-based ink according to claim 1, wherein said organic solvent is at least one member selected from the group consisting of phenethylcumen, diisopropylnaphthalene, isopropylnaphthalene and methylnaphthalene.

5. A non-aqueous, organic solvent-based ink according to claim 1, wherein said oil-soluble dye is selected from the group consisting of azo dyes, metal complex salt dyes, naphthol dyes, anthraquinone dyes, indigo dyes, carbonium dyes, cyanine dyes, quinoline dyes, nitro dyes, nitroso dyes, benzoquinone dyes, naphthoquinone dyes, naphthalimide dyes, perinone dyes, and phthalocyanine dyes.

* * * * *